United States Patent [19]

Flannery et al.

[11] 4,309,219

[45] Jan. 5, 1982

[54] PHASE SEPARATED, NON-CRYSTALLINE OPAL GLASSES

[75] Inventors: James E. Flannery, Corning; John L. Stempin, Beaver Dams; Dale R. Wexell, Corning, all of N.Y.

[73] Assignee: Corning Glass Works, Corning, N.Y.

[21] Appl. No.: 228,197

[22] Filed: Jan. 26, 1981

[51] Int. Cl.$^3$ .......................... C03C 3/04; C03C 3/08
[52] U.S. Cl. ........................................ 501/32; 501/59
[58] Field of Search ..................... 106/52, 54

[56] References Cited

U.S. PATENT DOCUMENTS 3,661,601 5/1972 Dumbaugh et al. ............... 106/54
3,673,049 6/1972 Giffen et al. ...................... 106/54 X
4,249,946 2/1981 Danielson ........................... 106/54

Primary Examiner—Helen M. McCarthy
Attorney, Agent, or Firm—Clinton S. Janes, Jr.

[57] ABSTRACT

This invention is directed to the production of spontaneous essentially non-crystalline opal glasses exhibiting a very dense, milky-white appearance and excellent resistance to weathering and attack by alkaline detergents consisting essentially, expressed in weight percent on the oxide basis, of 2–5% $K_2O$, 4–10% $Na_2O$, 4.5–12% RO, wherein RO consists of 0–3% MgO, 0–6% CaO, 0–8% SrO, and 0–11% BaO, 4–9% $B_2O_3$, 6–15% $Al_2O_3$, 0–5% $TiO_2$, 51–66% $SiO_2$, 1–6% $P_2O_5$, and 1–5% F.

3 Claims, No Drawings

PHASE SEPARATED, NON-CRYSTALLINE OPAL GLASSES

BACKGROUND OF THE INVENTION

The instant invention is directed to the production of spontaneous opal glasses which contain amorphous particles as the opacifying or light-diffusing phase. Thus, the glasses are phase separated, but non-crystalline, exhibit a very dense, milky-white appearance (unless colorants are added thereto), and strongly resist weathering and attack by acids and alkaline detergents, thereby recommending their utility for culinary ware and tableware.

This type of glass has been termed an immiscible opal, i.e., an opal glass wherein the opacifying phase is a glass which is insoluble in the basic glass matrix. Numerous attempts have been pursued in the past to develop an example of this type of opal glass which combines good chemical durability and resistance to weathering with a dense, white opacity.

To illustrate, U.S. Pat. No. 3,498,801 describes the preparation of opal glasses utilizing a liquid-liquid phase separation to impart opacification thereto, the glasses having compositions consisting essentially, in weight percent on the oxide basis, of 9-13.5% alkali metal oxide, the presence of $Na_2O$ being required, 1-2% CaO, 4-8% $Al_2O_3$, 5-12% $B_2O_3$, 60-68% $SiO_2$, and 3-5.5% $P_2O_5$. Up to 1.5% total of other alkaline earth metal oxides may optionally be included. $TiO_2$ and F are nowhere mentioned.

U.S. Pat. No. 3,506,464 discusses immiscible opal glasses consisting essentially, in mole percent on the oxide basis, of 3-6% $Na_2O$, 0-6% $Al_2O_3$, 7-11% $B_2O_3$, 78-85% $SiO_2$, and 1-6% $P_2O_5$. Alkaline earth metal oxides, $TiO_2$, and F are nowhere referred to in the specification.

U.S. Pat. No. 3,661,601 discloses immiscible opal glasses consisting essentially, in weight percent on the oxide basis, of 3-10% $Na_2O+K_2O$, 11-20% CaO, 1-7% $B_2O_3$, 3-9% $Al_2O_3$, 50-75% $SiO_2$, and 2-4% F. Up to 10% total of BaO, SrO, $P_2O_5$, $La_2O_3$, $TiO_2$, $Nb_2O_5$, ZnO, $GeO_2$, PbO, $Bi_2O_3$, and $CeO_2$ may be present. The opacifying droplets are believed to contain CaO and F or a combination of CaO, F, $B_2O_3$, and $SiO_2$.

U.S. Pat. No. 3,723,144 is concerned with immiscible opal glasses consisting essentially, in weight percent on the oxide basis, of 0.5-2.5% LiO, 7-10% ZnO, 11-14% $B_2O_3$, and 71-76% $SiO_2$. Up to 5% total of $Na_2O+K_2O+Al_2O_3$ may be present in the indicated proportions of 0-0.5% $Na_2O$, 0-3% $K_2O$, and 0-1.5% $Al_2O_3$. The alkaline earth metals, $TiO_2$, and F form no part of the compositions.

U.S. Pat. No. 3,728,139 relates to the manufacture of phase separated opal glasses consisting essentially, in weight percent on the oxide basis, of 0-10% $Li_2O$ and/or $Na_2O$ and/or $K_2O$, 8-15% $B_2O_3$, 0-15% of bivalent metal oxides selected from the group of BaO, CaO, CoO, CuO, MgO, MnO, NiO, and ZnO, 0-5% $TiO_2$ and/or $ZrO_2$, 0-3% $Al_2O_3$, 70-80% $SiO_2$, and 1-3% $As_2O_3$ and/or $MoO_3$ and/or $WO_3$. F is nowhere mentioned.

Whereas each of those disclosures describes opal glasses demonstrating relatively dense opacity and good chemical durability and resistance to weathering, the requirements for materials to be used for culinary and table ware have become more and more stringent, both with respect to the aesthetic appearance and the chemical durability of the ware. Accordingly, research has been constant to develop even better materials.

SUMMARY OF THE INVENTION

The present invention is designed to produce spontaneous, essentially non-crystalline opal glasses especially suitable for culinary and table ware exhibiting a very dense, milky-white appearance in thin cross section and excellent resistance to attack by alkaline solutions, particularly hot aqueous detergent solutions. The glasses are operable in microwave applications because of their non-crystalline nature and remain non-crystalline even after heat treatments to the annealing and softening points thereof. Hence, the glass articles can be air tempered without the development of crystallization therein. Finally, the glasses demonstrate coefficients of thermal expansion (25°-300° C.) over the range of about $65-85 \times 10^{-7}/°C$. and softening points in excess of 700° C., with the preferred compositions having softening points greater than 800° C. This latter feature allows the use of high temperature decorating frits where desired. The emulsion or opal liquidus is no higher than 1200° C., preferably, less than 1000° C.

Glasses which satisfy those conditions and which are capable of being melted and formed utilizing techniques conventional in the glass art, consist essentially, expressed in weight percent on the oxide basis, of 2-5% $K_2O$, 4-10% $Na_2O$, 4.5-12% RO, wherein RO consists of 0-3% MgO, 0-6% CaO, 0-8% SrO, and 0-11% BaO, 4-9% $B_2O_3$, 6-15% $Al_2O_3$, 0-5% $TiO_2$, 51-66% $SiO_2$, 1-6% $P_2O_5$, and 1-5% F.

The necessary components for the development of the light-diffusing, liquid-liquid phase separation comprise the 1-5% F, 2-6% $P_2O_5$, and 4-8% $B_2O_3$. Interspersed phosphate-rich and fluorine-rich non-crystalline glass phases occur when the $B_2O_3$, $P_2O_5$, and F are combined with the other oxides in the inventive system.

Glasses in this system containing substantially more than about 9% $B_2O_3$ demonstrate dense white opacity but with reduced acid and detergent durability. This reduction in chemical durability is believed to be attributable to a preferential chemical attack on at least one of the separated, non-crystalline phases present in the base glass. Where less than about 4% $B_2O_3$ is included in the composition, the glasses form milky white opals with a crystalline alkaline earth metal phosphate and/or an alkali metal-alkaline earth metal phosphate phase. The $B_2O_3$ functions as a fluxing agent and apparently promotes the liquid-liquid phase separation. The temperature of the working viscosity ($10^3$-$10^4$ poises) for these glasses is about 1300° C. or less and can be adjusted by varying the quantities of $B_2O_3$, $Na_2O$, $K_2O$, and F in the composition. $B_2O_3$ encourages the constituents of the inventive glasses to form interspersed amorphous phases manifesting substantial differences in refractive index. These differences provide the very dense white opacity of the opals.

Where the level of $P_2O_5$ is less than 1%, the glasses become translucent, losing the desired dense opacity. Glasses containing more than about 6% $P_2O_5$ are subject to phase separation at high temperatures, viz., about 1200°-1500° C. This circumstance hazards gross segregation problems in which a silica-rich glass and a phosphate-rich glass separates because of differences in density existing in the two phases. Increasing the phosphate content at the expense of the alkali metal and/or alkaline earth metal oxides tends to raise the softening point and forming temperature of the glass.

Where the concentration of F is less than 1%, the resulting opal glass will commonly contain a crystalline phosphate phase. As the F level is increased, the softening point and working temperature of the glass are significantly reduced. Amounts of F greater than about 5% do not benefit phase separation noticeably and the softening point is reduced to such an extent that decorating with durable, high temperature enamels becomes impossible. Moreover, excessive quantities of F lead to severe mold corrosion and air pollution problems because of the volatility of fluorine compounds during melting of the batch materials. In general, fluoride volatilization during melting is less than 25%.

The alkaline earth metal oxides and $TiO_2$ are utilized to enhance opacity. Those materials preferentially enter into the glassy matrix of one of the amorphous phases and assist in developing liquid phases with significantly dissimilar refractive indices. $TiO_2$ in concentrations greater than about 3% frequently imparts a creamy tan hue to the opal which is characteristic of $TiO_2$-containing glasses. Therefore, where present, $TiO_2$ will preferably be included in amounts between 0.5–3%. High concentrations of CaO can have a very deleterious effect upon the acid and alkali durability exhibited by the glasses since such lead to the formation of a non-durable, amorphous phase in the base glass or by causing extensive surface crystallization on the glass. Consequently, the level of CaO will be held below about 6%. Where the maximum amount of $P_2O_5$ is incorporated into the glass, CaO levels in excess of 6% cause the glasses to phase separate at about 1200°–1550° C. and frequently lead to the generation of surface or bulk devitrification as the glass is cooled.

MgO and SrO may be present in relatively small amounts to intensify opacity or to adjust physical properties, but such additions must be carefully controlled to avoid adversely altering other physical properties of the glass to any substantial extent and/or initiating gross phase separation.

BaO is unique among the alkaline earth metal oxides in not only enhancing opacity but also exerting a positive effect upon the acid and alkaline durability of the glasses. Because $Al_2O_3$, BaO, and $SiO_2$ improve the chemical durability of the glass, the preferred glasses will contain about 70–80% total of those materials. BaO demonstrates the side effects of lowering the softening point and increasing the density of the glass. Furthermore, at high levels of $P_2O_5$, large concentrations of BaO hazard gross phase separation. Accordingly, BaO will be kept below a maximum of about 11%.

Glasses with less than about 6% $Al_2O_3$ manifest poor detergent durability. $Al_2O_3$ is beneficial in stiffening the glass for forming purposes and improving the decorability thereof. It is believed that $Al_2O_3$ also acts to densify the glassy matrix, thereby preventing any gross migration of $Na^+$ and $F^-$ ions to the surface. Whereas $Al_2O_3$ plays a vital role in achieving glasses exhibiting excellent resistance to acid and alkali attack, more than 15% $Al_2O_3$ tends to flatten the viscosity of the glass which, in turn, causes an undesirable increase in the working temperature of the glass. The most preferred glasses will contain 9–14% $Al_2O_3$ to insure a high softening point for decorability and excellent resistance to attack by detergents.

The level of $Na_2O$ is carefully regulated in order to optimize the chemical and physical properties of the glass. Thus, $Na_2O$ in amounts greater than 10% tends to yield glasses displaying high coefficients of expansion and low softening points. Both of those factors are disadvantageous for decorability.

$K_2O$ behaves as a fluxing agent and, in conjunction with the other components, provides chemically durable, non-weathering glasses. However, $K_2O$ levels in excess of about 5% in combination with high concentration of $Na_2O$, i.e., about 9% or more, tend to be less durable because of the increased fluxing behavior thereof. The presence of at least 2% $K_2O$ in the total alkali metal oxide content appears to be necessary to form durable, non-weathering opals.

DESCRIPTION OF PREFERRED EMBODIMENTS

Table I records glass compositions, expressed in terms of parts by weight as calculated from the batch, illustrating the inventive products. Because the sum of the tabulated components totals or approximately totals 100, for all practical purposes the reported figures may be deemed to represent the compositions in terms of weight percent. Inasmuch as it is not known with which cation(s) the fluoride is combined, it is merely recited as F in accordance with conventional glass analysis practice.

The actual batch ingredients may comprise any materials, either the oxides or other compounds, which, when melted together, will be converted into the desired oxide in the proper proportions. Although the following description is drawn to laboratory scale melting and forming, it will be appreciated that the illustrative compositions could also be utilized in large scale melting units.

The batch ingredients were compounded, tumble mixed to aid in securing a homogeneous melt, and deposited into platinum crucibles. The crucibles were introduced into an electrically-heated furnace operating at 1450°–1550° C. and the batches melted for four hours. The melts were cast into steel molds to produce slabs having dimensions of about 6″×6″×0.5″ or manually pressed into discs of about 3–4″ in diameter and about 0.125–0.25″ in thickness. Pressing of the discs was undertaken to simulate roughly the quick quenching of the glass taking place during commercial automatic pressing operations. The glass slabs were transferred to a furnace operating at about the annealing temperature, that temperature sustained for about one hour, and then cooled to room temperature retained within the furnace (approximately 30° C./hour).

The annealed slabs demonstrated no translucency. The density of opacification exhibited by the pressed discs varied in accordance with the proximity of the forming temperature utilized to the emulsification temperature or opal liquidus of the glass. Most preferably to ensure dense opacity, the pressing temperature will not be in excess of about 80° C. above the emulsification temperature.

TABLE I

|  | 1 | 2 | 3 | 4 | 5 | 6 | 7 | 8 | 9 |
|---|---|---|---|---|---|---|---|---|---|
| $SiO_2$ | 52.04 | 57.09 | 58.92 | 58.40 | 60.32 | 64.04 | 58.41 | 59.16 | 60.10 |
| $Al_2O_3$ | 10.86 | 8.80 | 11.03 | 8.87 | 8.90 | 8.95 | 11.75 | 11.73 | 10.37 |
| $Na_2O$ | 8.36 | 7.14 | 5.81 | 8.54 | 7.21 | 4.53 | 7.14 | 5.79 | 7.20 |
| CaO | 2.39 | 2.43 | 1.61 | 1.57 | 1.63 | 1.64 | 1.61 | 1.61 | 1.63 |
| $B_2O_3$ | 7.90 | 6.51 | 8.03 | 6.56 | 6.59 | 6.62 | 6.51 | 6.50 | 6.57 |
| $K_2O$ | 4.01 | 3.39 | 2.72 | 4.10 | 3.42 | 2.20 | 2.71 | 3.38 | 2.19 |
| BaO | 6.54 | 6.62 | 4.42 | 4.45 | 4.46 | 4.49 | 4.42 | 4.41 | 4.45 |
| $P_2O_5$ | 4.03 | 4.09 | 4.10 | 4.12 | 4.13 | 4.15 | 4.09 | 4.08 | 4.12 |

TABLE I-continued

| | | | | | | | | | |
|---|---|---|---|---|---|---|---|---|---|
| MgO | 1.71 | 1.74 | 1.16 | 1.17 | 1.17 | 1.18 | 1.16 | 1.15 | 1.17 |
| F | 2.16 | 2.19 | 2.19 | 2.16 | 2.15 | 2.22 | 2.19 | 2.18 | 2.21 |

| | 10 | 11 | 12 | 13 | 14 | 15 | 16 | 17 |
|---|---|---|---|---|---|---|---|---|
| $SiO_2$ | 61.63 | 63.55 | 62.32 | 61.92 | 60.64 | 55.36 | 61.20 | 61.67 |
| $Al_2O_3$ | 8.90 | 8.93 | 8.95 | 10.36 | 10.35 | 13.21 | 10.33 | 8.40 |
| $Na_2O$ | 5.86 | 5.88 | 7.26 | 5.85 | 7.64 | 8.48 | 6.73 | 8.83 |
| CaO | 1.63 | 1.63 | 1.64 | 1.62 | 1.62 | 1.61 | 1.62 | 5.05 |
| $B_2O_3$ | 6.58 | 4.57 | 5.60 | 5.55 | 4.54 | 6.47 | 4.53 | 4.71 |
| $K_2O$ | 3.42 | 3.43 | 2.20 | 2.74 | 3.28 | 4.07 | 3.59 | 4.24 |
| BaO | 4.46 | 4.48 | 4.49 | 4.45 | 4.45 | 4.41 | 4.44 | — |
| $P_2O_5$ | 4.13 | 4.15 | 4.16 | 4.12 | 4.12 | 4.09 | 4.11 | 4.26 |
| MgO | 1.17 | 1.17 | 1.18 | 1.18 | 1.17 | 1.16 | 1.16 | — |
| F | 2.21 | 2.22 | 2.22 | 2.21 | 2.20 | 1.10 | 2.20 | 2.28 |
| $TiO_2$ | — | — | — | — | — | — | — | 0.61 |

| | 18 | 19 | 20 | 21 | 22 | 23 | 24 | 25 |
|---|---|---|---|---|---|---|---|---|
| $SiO_2$ | 63.92 | 64.93 | 63.02 | 55.79 | 54.92 | 56.97 | 59.67 | 54.04 |
| $Al_2O_3$ | 7.02 | 7.03 | 8.82 | 10.93 | 10.51 | 10.74 | 10.56 | 10.50 |
| $Na_2O$ | 6.64 | 6.65 | 4.02 | 8.41 | 8.09 | 8.27 | 4.28 | 8.09 |
| CaO | 4.89 | 4.90 | — | — | — | — | — | — |
| $B_2O_3$ | 6.93 | 5.87 | 7.53 | 7.46 | 7.66 | 7.82 | 6.25 | 7.27 |
| $K_2O$ | 3.32 | 3.32 | 3.12 | 4.04 | 3.87 | 3.97 | 2.09 | 3.88 |
| BaO | — | — | 6.61 | 6.65 | 6.32 | 6.47 | 10.59 | 6.32 |
| $P_2O_5$ | 4.35 | 4.36 | 4.10 | 4.06 | 3.89 | 1.99 | 3.92 | 5.85 |
| F | 2.32 | 2.33 | 2.16 | 2.17 | 2.18 | 3.20 | 2.10 | 3.33 |
| TiO | 0.62 | 0.61 | 0.58 | 0.57 | 0.55 | 0.56 | 0.55 | 0.55 |

Table II records softening points (S.P.) in terms of °C. and coefficients of thermal expansion (Exp.) over the temperature range of 25°–300° C. expressed in terms of $\times 10^{-7}/°C.$, both determinations being conducted in accordance with measuring techniques conventional in the glass art. Fast cool emulsion or opal liquidus data (Liq.) expressed in terms of °C. were obtained employing a hot stage microscope composite apparatus.

Samples of several glasses were screened for potential weathering problems by boiling in distilled water for one hour and analyzing the water for $Na_2O$ content. Where less than 4 μg $Na_2O/cm^2$ were extracted (Ext.) from the specimens, the glass was considered to be desirably resistant to weathering.

Detergent resistance (D.R.) was investigated via immersing specimens of the glasses into a 0.3% aqueous solution of SUPER SOILAX ® brand detergent, marketed by Economics Laboratories, St. Paul, Minn., operating at 95° C. for periods of 24, 48, 72, and 96 hours. An exposure of 96 hours has been estimated to be equivalent to about 10 years of use in a household dishwasher in an average home. The surface areas of the specimens were limited to a ratio of 12 square inches of glass to one pound of the solution. The samples were removed periodically from the hot solution, rinsed in tap water, and wiped dry. Thereafter, a portion of each specimen was coated with DYE-CHEK ® brand dye penetrant, marketed by Magna-Flux Corporation, Chicago, Ill., the dye permitted to remain in contact therewith for 20 seconds, and the sample then wiped dry. Where no stain is evident after the dye has been wiped from the glass surface with a dry cloth, the specimen is given the classification "AA". Samples from which the stain can be removed from the glass surface with a cloth dampened with SUPER SOILAX ® brand detergent are classified "A". Where the stain can be removed by first wiping with a detergent-dampened cloth followed by the application of a commercial powdered cleanser, the glass is categorized as "B". When the stain cannot be removed by any of the above techniques, the glass is given a "C" rating. Furthermore, where visual inspection indicates any loss of surface gloss after the solution treatment, the specimen is labeled "l.o.g." (loss of gloss) which is deemed to be equivalent to a "C" rating.

Finally, X-ray diffraction analyses (X-ray) were carried out on the exemplary compositions. Several of the examples appeared to contain a trace of crystallinity (indicated by an X), the identity of which could not be ascertained due to the extremely small amount present. Because of the base glass compositions of the glasses involved, it is speculated that the crystals may be α-$CaNaPO_4$ and/or $Ca_3(PO_4)_2$.

TABLE II

| | 1 | 2 | 3 | 4 | 5 | 6 | 7 | 8 | 9 |
|---|---|---|---|---|---|---|---|---|---|
| S.P. | — | 756 | 834 | 737 | 766 | — | 790 | 829 | 799 |
| Exp. | — | 78.1 | 65.7 | 82.2 | 76.2 | — | 71.6 | 69.1 | 69.2 |
| Liq. | 1020 | 850 | 840 | 610 | 600 | 660 | 910 | 970 | 650 |
| Ext. | — | — | — | 2.8 | 2.5 | — | — | — | 2.5 |
| D.R. | | | | | | | | | |
| 24 | A | A | A | AA | AA | A | A | A | A |
| 48 | A | A | A | A | A | A | A | A | A |
| 72 | A | A | A | A | A | A | A | A | A |
| 96 | A | A | A | l.o.g. | A | A | A | A | A |
| X-ray | | | X | X | | | | X | X |

| | 10 | 11 | 12 | 13 | 14 | 15 | 16 | 17 |
|---|---|---|---|---|---|---|---|---|
| S.P. | 798 | 839 | 789 | 876 | — | — | — | 713 |
| Exp. | 67.7 | 67.3 | 70.4 | 65.5 | — | — | — | 81.3 |
| Liq. | 1060 | 1200 | 1110 | 1030 | 600 | 750 | 890 | 500 |
| Ext. | — | — | — | — | — | — | — | — |
| D.R. | | | | | | | | |
| 24 | A | A | A | A | A | A | A | AA |
| 48 | A | A | A | A | A | A | A | AA |
| 72 | A | A | A | A | A | A | A | AA |
| 96 | A | A | A | A | A | A | A | A |
| X-ray | | | X | | X | X | X | X |

| | 18 | 19 | 20 | 21 | 22 | 23 | 24 | 25 |
|---|---|---|---|---|---|---|---|---|
| S.P. | 749 | 756 | — | — | 681 | 682 | 844 | 709 |
| Exp. | 67.3 | 66.8 | — | — | 79.3 | 76.9 | 60.0 | 79.4 |
| Liq. | 600 | 680 | 950 | 970 | 480 | 780 | 780 | 780 |
| Ext. | — | — | — | — | — | — | — | — |
| D.R. | | | | | | | | |
| 24 | AA | AA | A | A | A | A | A | A |
| 48 | AA | AA | A | A | A | A | A | A |
| 72 | AA | AA | A | A | A | A | A | A |
| 96 | A | A | A | A | A | A | A | l.o.g. |
| X-ray | X | X | | | | | | |

Examples 3, 7, and 10 represent the most preferred compositions since they exhibit relatively high softening points, relatively low coefficients of thermal expansion, and are entirely free from crystallization.

It will be appreciated that, where desired, conventional glass colorants, such as CoO, $Cr_2O_3$, CuO, $Fe_2O_3$, $MnO_2$, NiO, and $V_2O_5$, may be incorporated into the base glass composition in quantities customary in the glass art, normally less than 5% by weight.

We claim:

1. A spontaneous, essentially non-crystalline opal glass exhibiting a very dense, milky-white appearance, a softening point in excess of 700° C., a coefficient of thermal expansion (25°–300° C.) between about $65-85 \times 10^{-7}/°C.$, an opal liquidus no higher than 1200° C., and excellent resistance to weathering and attack by alkaline detergents consisting essentially, expressed in terms of weight percent on the oxide basis as calculated from the batch, of 2–5% $K_2O$, 4–10% $Na_2O$, 4.5–12% RO, wherein RO consists of 0–3% MgO, 0–6% CaO, 0–8% SrO, and 0–11% BaO, 4–9% $B_2O_3$, 6–15% $Al_2O_3$, 0–5% $TiO_2$, 51–66% $SiO_2$, 1–6% $P_2O_5$, and 1–5% F.

2. A spontaneous opal glass according to claim 1 containing 0.5–3% $TiO_2$ and/or 9–14% $Al_2O_3$.

3. A spontaneous opal glass according to claim 1 also containing up to 5% total of a colorant selected from the group of CoO, $Cr_2O_3$, CuO, $Fe_2O_3$, $MnO_2$, NiO, and $V_2O_5$.

* * * * *